Nov. 9, 1965

G. B. RICHARDS ETAL 3,216,619

LIQUID TRANSMISSION SYSTEM

Filed Aug. 27, 1962

INVENTORS
George B. Richards
and Charles H. Rystrom
By Fidler, Beardsley & Bradley
Attys.

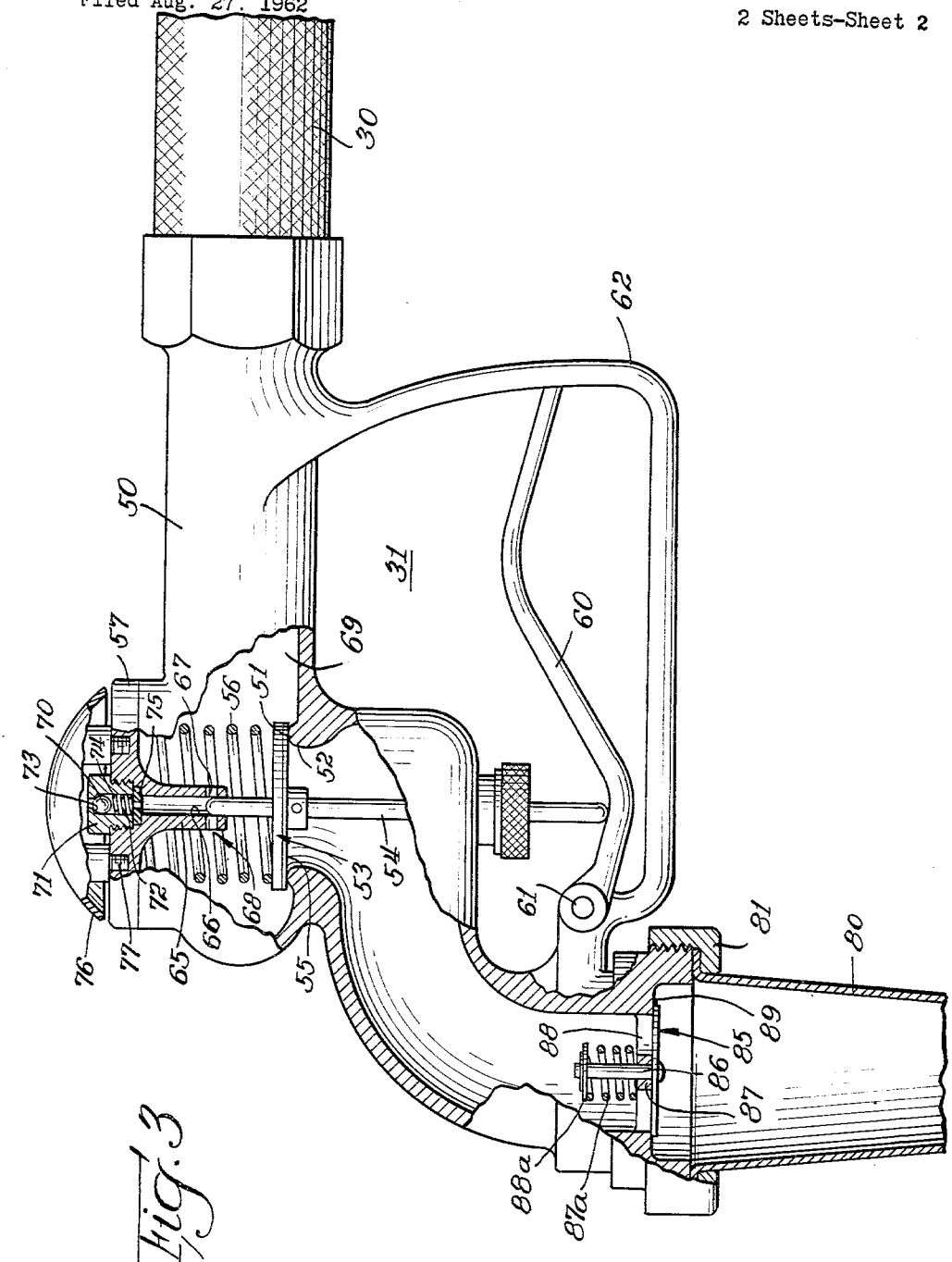

United States Patent Office
3,216,619
Patented Nov. 9, 1965

3,216,619
LIQUID TRANSMISSION SYSTEM
George B. Richards, Lake Forest, and Charles H. Rystrom, Long Grove, Ill., assignors to Liquid Controls Corporation, North Chicago, Ill., a corporation of Illinois
Filed Aug. 27, 1962, Ser. No. 219,552
13 Claims. (Cl. 222—74)

This invention relates to liquid transmission apparatus and has to do more particularly with a novel apparatus for controlling the delivery of liquid and wherein liquid is automatically evacuated from at least a portion of the apparatus when the delivery operation is halted.

Liquid transmission systems are commonly employed for delivering liquids, which systems include a delivery conduit, commonly comprising a hose connected to a source of supply of the liquid and having a cut-off valve at or near the delivery end whereby the operator may control the flow of liquid when stationed adjacent the delivery end. Often it is desirable to return the conduit, usually a hose, to a position adjacent the source which may be, for example, a fixed tank, a fixed conduit, tank truck or a tank car. In order to make the delivery the operator carries the delivery end of the conduit to the point to which delivery is to be made, commonly the intake of a tank or a fixed conduit, and then opens the cut-off valve to permit the delivery and when the delivery has been completed closes the valve to halt the flow of liquid. Thereafter, the operator usually returns the conduit to its original position adjacent the source, where it is usually wound on a reel or drum. Often the conduit is relatively long and consequently when filled with liquid is relatively heavy. Thus, the diameter of the conduit must be limited to prevent the conduit from being too heavy when filled with liquid to be capable of being carried by the operator. Moreover, even where a relatively small diameter conduit is used, its length is limited because of the weight of the conduit when filled with liquid.

In accordance with the present invention a delivery system is provided which includes a conduit adapted to be connected to a source of supply of liquid and having pumping means for causing liquid to flow in either direction in the conduit, a cut-off valve adjacent the delivery end of the conduit for controlling the flow of liquid through the conduit and means for automatically controlling the pumping means to evacuate the liquid from the conduit when the cut-off valve is closed.

An object of the present invention is to provide a liquid delivery apparatus wherein at least a portion of the apparatus is automatically evacuated of liquid in a direction opposite to the delivery direction when the delivery action is terminated.

Another object is to provide liquid delivery apparatus having a conduit wherein the delivery of liquid and evacuation of liquid from the conduit in a direction opposite to the delivery direction may be controlled from adjacent the delivery end of the apparatus and remote the source of supply.

Another object is to provide liquid delivery apparatus of the type having a cut-off valve for controlling the flow of liquid in a delivery direction and wherein evacuation of liquid from at least a portion of the apparatus is effected automatically when the cut-off valve is closed.

Another object is to provide a liquid delivery apparatus which is readily operated from a single control station to both effect the delivery of the liquid and the evacuation of at least a portion of the apparatus.

A further object is to provide liquid delivery apparatus of the type having a conduit adapted to be connected at one end to a source of supply and having a cut-off valve adjacent the delivery end and wherein the flow of liquid in and the evacuation of liquid from the conduit is controlled by sensing the fluid pressure in the conduit at a point remote from the delivery end.

Other objects and advantages of the invention will appear from the following description taken in connection with the appended drawings wherein:

FIG. 3 is an enlarged, fragmentary, view showing a nozzle constructed in accordance with the invention and suitable for use in the apparatus of either FIG. 1 or FIG. 2.

Figure 1:
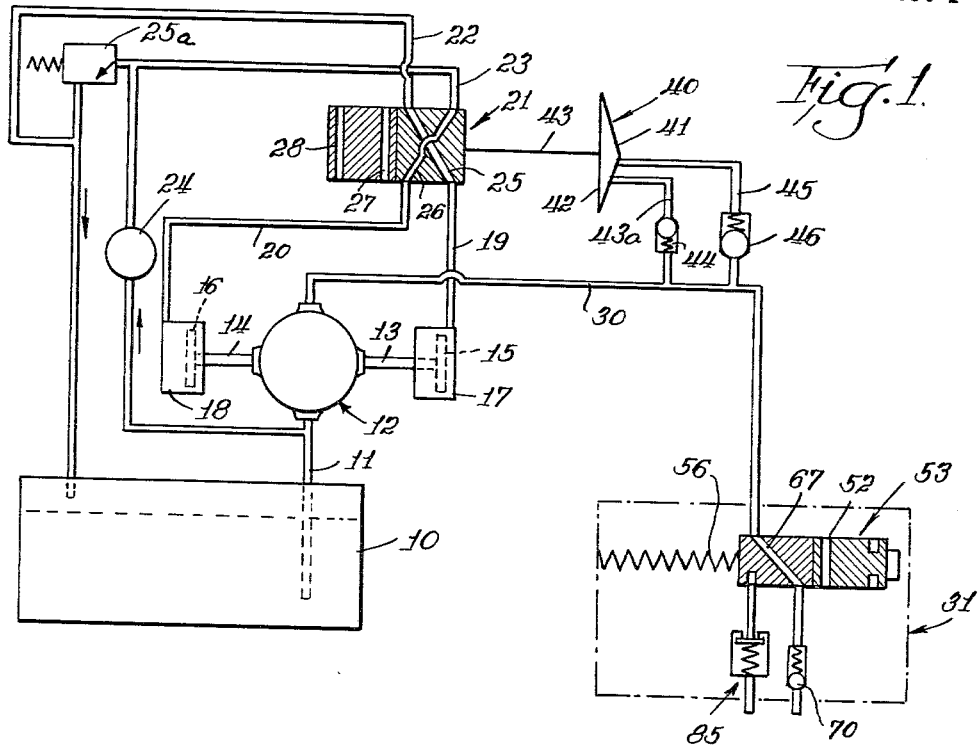
FIG. 1 is a diagrammatic view showing one form of apparatus constructed in accordance with the invention.

The apparatus is adapted to be connected to a source of liquid to be dispensed, and for the purposes of illustration a fixed tank 10 is shown. It will be understood, however, that the apparatus may be connected to any suitable other source such as a tank car, tank truck, or to the end of a transmission line (not shown).

Connected to the tank 10 by a conduit 11 is a pump 12 which in the illustrative embodiment is a reversible, rotary pump. Since any suitable form of reversible pump may be employed, the pump is not shown or described in detail. The pump may be similar to that shown and described in United States patent to Warren R. Tucker, No. 2,394,120, dated February 5, 1946, or that shown in the United States Patent to Norman F. McMillan and Howard M. Purcell, No. 2,545,238, dated March 13, 1951.

The pump 12 is adapted to be rotated in one direction and the direction of flow is adapted to be reversed by shifting an inner casing (not shown) surrounding the rotor. For the purpose of shifting the inner casing (not shown) to reverse the direction of fluid pumped two control rods 13 and 14 are provided which are connected to pistons 15 and 16 and disposed in cylinders 17 and 18. The cylinders 17 and 18 are connected through conduits 19 and 20 to a control or reversing valve 21 which is connected by a conduit 22 to the tank 10. The reversing valve 21 is also connected through a second conduit 23 to the tank 10 in which latter conduit is connected a charging pump 24. The conduit 23 is connected through a maximum flow check valve 25a to the conduit 22 which valve upon the occurrence of a flow in the conduit 23 in excess of a predetermined flow opens to permit liquid to be returned through the conduit 22 to the tank 10.

The outlet from the pump 12 is connected to a dispensing conduit 30 which may be formed by a pipe or a flexible, collapsible hose or partly by a pipe and partly by a hose. The conduit 30 preferably is formed throughout a substantial portion of a hose which after evacuation of the liquid contents may be collapsed and rolled onto a reel (not shown) in a customary manner so that it is in compact form.

The reversing valve 21 is constructed to reverse the connections between the conduits 19 and 20 on the one hand and the conduits 22 and 23 on the other hand. In the initial or normal position of the valve 21 (as shown in FIG. 1) the conduit 19 is connected through the passage 25 to the conduit 22 and conduit 20 is connected through the passage 26 to the conduit 23, thus the cylinder 18 is connected to the charging pump 24 and the inner casing (not shown) is shifted to the right with the result that the pump 12 is active to withdraw liquid from the conduit 30 and return it to the tank 10.

On the other hand, when the valve 21 is moved to its other position (to the right as viewed in FIG. 1) the conduit 23 is connected through the passage 27 with the conduit 19, and the conduit 22 is connected through the passage 28 to the conduit 20. When this occurs liquid pressure is applied to the cylinder 17 to shift the inner casing (not shown) to the left (as shown in FIG. 1) which causes the pump to operate to withdraw liquid from the tank 10 through the conduit 11 and pump it through the conduit 30 toward the nozzle 31. For convenience, we have designated hereinafter the pumping of liquid from the tank 10 to the nozzle 31 as a "fueling" operation and the pumping of liquid in the reverse direction, that is, from the nozzle 31 to the tank 10 as a "defueling" operation. These terms are used because the invention is especially well adapted for use in dispensing fuels such as fuel oil and gasoline. However, it will be understood that the invention is not limited to use with liquid fuels but can be used in dispensing any liquids.

A control device 40 is provided for controlling the operation of the reversing valve 21 in accordance with the fluid pressures within the conduit 30 as hereinafter explained. The control device 40 includes a casing 41 with which cooperates a pressure-responsive member such as a diaphragm 42 connected mechanically as by a connecting rod 43 to the valve 21. The diaphragm 42 initially positions the valve 21 in the position shown in FIG. 1. However, when a predetermined vacuum (for example, around two and one-half pounds per square inch) occurs in the conduit 30, the diaphragm 42 is moved to the right (as shown in FIG. 1) to move the valve 21 to its other position.

The casing 41 is connected to the conduit 30 by a conduit 43a having therein a one way check valve 44. The arrangement is such that whenever a vacuum is drawn on the conduit 30 the check valve opens to permit the vacuum to be applied to the diaphragm 42. However, when there is pressure in the conduit 30 the valve closes and prevents the pressure from being applied to the diaphragm through the conduit 43a.

A second conduit 45 having therein a check valve 46 is connected to the casing 41 and to the conduit 30. The check valve 46 is so arranged as to be closed whenever a vacuum is drawn on the conduit 30 but to be opened when a predetermined pressure, as hereinafter explained, is applied to the conduit 30, thus permitting the diaphragm to be moved to the left to return the reversing valve 21 to its original condition.

The nozzle 31 which is shown diagrammatically in FIG. 1 is shown more in detail in FIG. 3 and reference is therefore now made to that figure.

The nozzle 31 includes a housing 50 which is connected at one end to the conduit 30. The casing 50 is formed with a valve seat 51 having an opening 52 therethrough to permit the passage of liquid through the casing 50. A cut-off valve 53 (also shown somewhat diagrammatically in FIG. 1) is carried by a valve stem 54 slidably mounted in the casing, the valve 53 being slidable between a position against the seat 51 and closing the opening 52 and a position above the seat 51 wherein the opening 52 is opened to permit the flow of liquid therethrough. The valve 53, if desired, may be provided with a facing 55 of resilient sealing material. The valve 53 is normally urged into closed position by a spring 56 seated at one end against the valve 53 and at the other end against a cap 57 closing the open upper end of the casing 50 and suitably secured thereto in a manner not shown.

The stem 54 extends downwardly through a seal (not shown) and out of the casing and at its lower end bears against a handle 60 pivoted at 61 to the casing for swinging movement. A guard 62 may be provided around the handle 60 in the usual manner. Normally, the handle 60 is urged in the position shown by the spring 56 acting upon the valve 53 which is carried on the stem 54. The valve 53 is opened by rocking the handle 60 about the pivot 61 in the usual manner (counterclockwise as viewed in FIG. 3).

The cap 67 is formed with a depending portion 65, having a bore 66 which communicates at its lower end with a cross-bore 67 opening into the interior 69 or valve chamber of the housing 60. At its upper end the bore 66 opens to atmosphere through a check valve 70 carried in a valve casing 71 and threaded into the cap 60. The casing 71 is formed with a bore 72 providing communication between the bore 66 and the atmosphere and having a seat 73 at its upper end adapted to be closed by a check valve 70. A spring 74 is provided for urging the valve 70 to closed position with a light pressure preferably around two and one-half pounds. A retaining washer 75 is preferably provided for seating the valve spring 74. A protective hood 76 is provided over the valve housing 71 which hood is suitably secured to the cap 57 as by screws 77. The hood 76 is spaced from the cap 57 in order to permit air to flow freely into the valve housing 71 when the valve 70 is open.

It will be seen that when the valve stem 54 is in its lower position the outlet openings provided by the ends of the bore 67 between the bore 66 and the valve chamber 69 are opened. On the other hand, when the valve stem 54 is moved to its upper position it closes the bore 67 and, thus, closes off communication between the bore 66 and the interior or valve chamber 69. Accordingly, there is provided a valve 68 between the valve chamber 69 and the bore 66. In other words, there is a valve 68 between the valve chamber 69 and the atmosphere which valve is open when the valve 53 is closed and is closed when the valve 53 is open.

A nozzle extension 80 of conventional form may be secured to the end of the casing 50 as by a threaded ring 81. The extension 80 may include a filter member (not shown) for removing solid foreign particles from a liquid being discharged from the nozzle 50.

A check valve 85 is provided in the casing 50 on the downstream side of the cut-off valve 53 which under line pressure opens in the direction of discharge of the liquid from the casing 50. The valve 85 is normally closed except when opened under line pressure. The valve 85 is carried on a stem 86 slidable in a hub 87 supported by ribs 88 in the nozzle casing 50. A spring 87a seated against a disk 88a secured to the valve stem 86 normally urges the valve 85 to closed position against a valve seat 89 and closing the outlet from the casing 50.

It will be understood that when the main valve 53 initially is opened and the valve 68 closed, the check valve 85 remains closed, thus it is possible to draw the slight vacuum on the interior of the nozzle 31 as hereinafter explained.

When it is desired to dispense liquid from the source such as the tank 10, the pump 12 is driven in a suitable manner as by an electric motor (not shown) to rotate the rotor (not shown). Normally, the handle 60 will be in its lower position and the cut-off valve or main valve 53 will be closed. The valve 68 will be open and the check valve 85 will be closed. The valve 70 which may be termed a "vacuum breaker" is closed under only light pressure so that upon the occurrence of vacuum in the chamber 69 exceeding such light pressure the valve 70 will be opened. The air in the chamber 69 will be under atmospheric pressure.

Under the conditions stated, the control device 40 will be in its initial condition and the reversing valve 21 will be in the position (as shown in FIG. 1) wherein the pump 24 is connected to the cylinder 18 to maintain the pump in its defueling position, thus the contents of the conduit 30 upstream of the cut-off valve 53 will be evacuated. In view of the fact that the valve 68 is open, the chamber 69 and the interior of the conduit 30 will be at atmospheric pressure.

In order to dispense liquid from the conduit 30 the handle 60 is raised, which opens the main or cut-off valve 53 and closes the valve 68. The arrangement is such that a slight negative pressure or vacuum—for example, around two and one-half pounds per square inch, is created in the conduit 30. Owing to the fact that the valve 68 is closed no air can enter the valve chamber 69. The check valve 85 will remain closed.

When the aforesaid vacuum is created in the conduit 30 the valve 44 is opened and the vacuum applied to the diaphragm 42, thus causing the valve 21 to be moved from its defueling to its fueling position. Thereupon the charging pump is connected to the cylinder 17 and at the same time the cylinder 18 is connected to the tank 10. This effects a shifting movement of the inner casing (not shown) which reverses the direction of discharge of the pump 12 so that the liquid is pumped from the tank 10 to the conduit 30 and discharged from the nozzle 31. Check valve 85 is opened under the pressure of the fluid in the nozzle 31 to permit such discharge. The line pressure may be of any suitable value and we have found that a value of between thirty pounds per square inch and eighty pounds per square inch is satisfactory. In this connection, since pressure exists in the conduit 30 the valve 44 remains closed. However, the pressure is not sufficient to open the valve 46, this valve being arranged to be opened only under a pressure exceeding the normal discharge pressure, as hereinafter explained.

When the desired quantity of liquid has been dispensed the operator releases the handle 60, which allows the valve 53 to close and the valve 68 to open. The valve 85 is closed under its own spring pressure and cuts off any drip from the nozzle. As soon as the main valve 53 is closed the pressure in the conduit 30 rises above the flow or line pressure, for example, around eighty pounds, and to an amount equal to the pump shut-off pressure which, for example, may be around one hundred pounds per square inch. As the pressure rises in the conduit 30, the check valve 70 remains closed and prevents any flow of liquid from the nozzle. This increased pressure in the conduit 30 is sufficient to open the valve 46 and permit the pressure in the conduit 30 to be applied to the diaphragm 42 which causes the reversing valve 21 to be moved to its initial position.

When this occurs the pumping action of the pump 12 is reversed and the pump 12 serves to evacuate liquid from the conduit 30. Since the valve 68 is open and the valve 70 opens under light vacuum there is no interference with the evacuation of the contents of the conduit 30 and the return of such contents to the tank 10. When the conduit 30 is completely evacuated it may be flattened and rolled onto a reel in the usual manner.

It will be seen from the foregoing that the operations of both fueling and defueling can be carried out with the operator stationed at the discharge end of the conduit 30 and it is not necessary for him to return to the receiving end of the conduit except to return the conduit to its reel (not shown). The fueling operation is initiated by actuating the handle 60 to open the main valve 53 and the pump 12 is reversed automatically. When the operator desires to halt the discharge operation he merely releases the handle 60 whereupon the discharge is automatically reversed to effect the evacuating operation, the liquid evacuated from the conduit 30 and nozzle 31 being returned to the tank 10.

Figure 2:
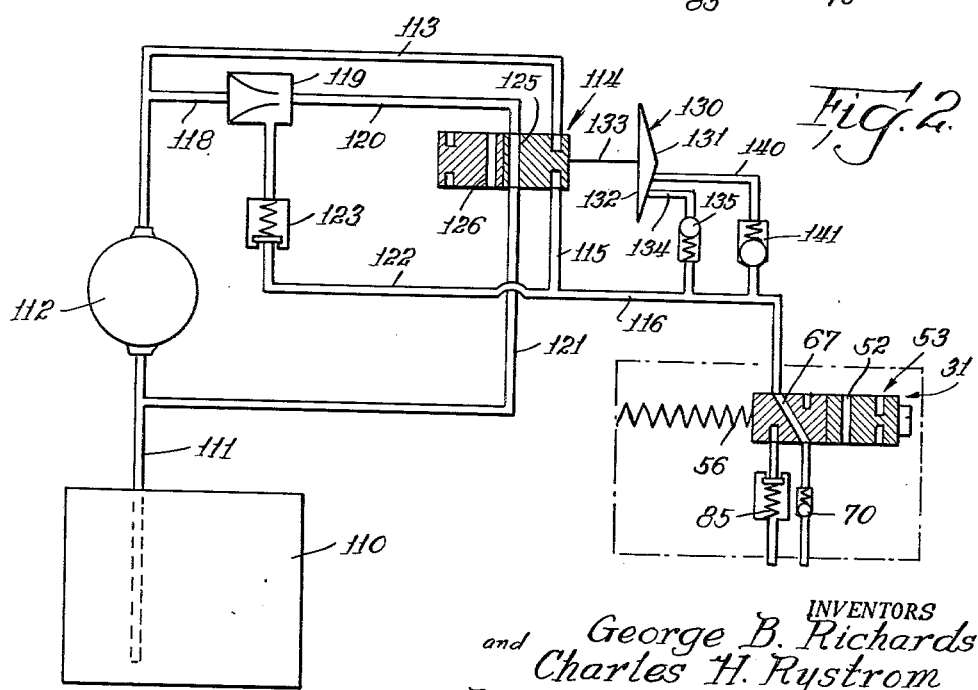
FIG. 2 is a diagrammatic view showing a second embodiment of apparatus constructed in accordance with the invention.

Referring now to FIG. 2 of the drawings, there is shown an embodiment of the invention employing a slightly different form of pumping means wherein a unidirectional pump of suitable construction is employed and it is not necessary to use a reversible pump.

The apparatus includes a tank 110 connected by a conduit 111 to a unidirectional pump 112. The pump is connected by a conduit 113 to a reversing valve 114 which in turn is connected by a conduit 115 to a main conduit 116 which is connected to a nozzle 31. Connected to the conduit 113 at a point between the pump 112 and the reversing valve 114 is a conduit 118 which is connected to the primary inlet of an eductor 119. The outlet of the eductor 119 is connected by a conduit 120 to the reversing valve 114. A conduit 121 connects the reversing valve 114 back to the conduit 111.

A conduit 122 is connected between the conduit 115 and the secondary inlet of the eductor and includes therein a one way check valve 123. The conduit 122 also is connected to the conduit 116.

The arrangement is such that when the reversing valve 114 is in its initial or defueling position (as seen in FIG. 2) the conduit 120 is connected through the passage 125 to the conduit 121, and thus there is a closed circuit from the outlet of the pump 112 through the eductor 119 and the reversing valve 114 and back to the conduit 111.

On the other hand, when the reversing valve is in its other or fueling position the conduit 113 is connected through the passage 126 to the conduit 115, and thus there is provided a connection from the outlet of the pump 112 to the conduit 116 and consequently the nozzle 31.

A control device 130 is provided for controlling the reversing valve 114 in accordance with the pressure conditions within the conduit 116. This device includes a casing 131 having therein a pressure responsive member such as a diaphragm 132 connected mechanically as by a member 133 to the valve 114. The casing 131 is connected to the conduit 116 by a conduit 134 having therein a check valve 135 adapted to prevent the flow of liquid from the conduit 116 back to the casing 131 but adapted to be opened under relatively light vacuum.

Also connected between the casing 131 and the conduit 116 is a conduit 140 having therein a check valve 141 adapted to prevent the flow of fluid from the casing 131 to the conduit 116 but adapted to be opened under relatively high pressure to permit the passage of fluid from the conduit 116 to the casing 131.

The nozzle 31 shown in FIG. 2 is preferably identical in all respects to the nozzle 31 shown in detail in FIG. 3 and described in connection therewith.

The manipulation of the apparatus of FIG. 2 by the operator is the same as the manipulation of the form of the invention shown in FIG. 1, and the general result is the same. However, the operation of the apparatus is somewhat different in view of the different pumping arrangement provided.

The pump 112 is energized and, as above mentioned, pumps the liquid in one direction, namely, from the conduit 111 to the conduit 113. With the reversing valve 114 in its defueling position (as shown in FIG. 2) the liquid flows through the eductor 119 thence through the reversing valve 114 and back to the conduit 111. The flow of the liquid through the eductor 119 creates a suction in the conduit 122 and consequently in the conduit 116 which causes an evacuating action in the conduit 116. The check valve 123 opens to permit such action. At this time, also, the valve 68 is open so that air is drawn into the casing 50 and there is no vacuum created in the nozzle 31.

In order to dispense liquid from the conduit 116 the handle 60 (FIG. 3) is raised to open the cut-off valve 53 and to close the valve 68. Thus, a slight negative pressure or vacuum—for example around two and one-half pounds per square inch—is created in the conduit 116. The valve 135 accordingly is opened and the vacuum applied to the diaphragm 132 thus causing the reversing valve 114 to be moved to the right (as shown in FIG. 2). Thus the valve 114 is moved from its defueling position to its fueling position. This closes the connection between the conduit 120 and the conduit 121, thus halting the flow of liquid through the eductor 119. At the same time the conduit 113 is connected to the conduit 115 and thus to the main conduit 116.

Since the cut-off valve 53 is open liquid flows in the conduit 116 under line pressure and opens the check valve 85 and, therefore, flows from the nozzle 31. Since only line pressure is present in the conduit 116 the check valve 141 remains closed and the reversing valve 114 remains in its fueling position.

When the desired quantity of liquid has been dispensed the operator releases the handle 60 which allows the valve 53 to close and the valve 68 to open. The valves 85 and 70 also are closed. As soon as the main valve 53 is closed the pressure in the conduit 116 rises above the flow or line pressure and to an amount equal to the pump shut-off pressure. This pressure is sufficient to open the valve 141 and cause the diaphragm 132 to return the reversing valve 114 to defueling position.

When this occurs the conduit 113 is disconnected from the conduit 115 and the conduit 120 is connected to the conduit 121. The eductor 119 thus is rendered active by the passage of liquid therethrough from the conduit 118 to the conduit 120. This creates an aspirator action which draws liquid from the conduit 116 through the conduit 122 and the check valve 123 thereby to exhaust the liquid from the conduit 116 and the nozzle 31 upstream of the cut-off valve 53. The liquid which is evacuated from the conduit 116 and drawn into the eductor 119 is discharged from the eductor through the conduit 120, the reversing valve 114 and the conduit 121 and any liquid in excess of the capacity of the eductor circuit is returned to the tank 110.

As explained in connection with the first embodiment of the invention, the complete operation of the device, including both fueling and defueling, can be controlled by the operator at the nozzle and it is not necessary for him to return to the receiving or inlet end of the line except to return the conduit to its reel.

We claim:

1. A liquid transmission system comprising a conduit having a receiving end for connection to a supply of liquid and a delivery end, pumping means connected to said conduit for causing liquid to flow in either direction in said conduit, a cut-off valve in said conduit for controlling the flow of liquid from said delivery end, and means responsive to the operation of said cut-off valve for causing said pumping means to pump liquid toward said delivery end when said cut-off valve is open and to pump liquid from said conduit toward said receiving end in the opposite direction when said cut-off valve is closed.

2. A liquid transmission system comprising, a conduit having a receiving end for connection to a supply of liquid and a delivery end, pumping means connected to said conduit for causing liquid to flow in either direction in said conduit, a cut-off valve in said conduit between said pumping means and said delivery end, means for venting said conduit to atmosphere intermediate said pumping means and said cut-off valve when said cut-off valve is closed and for sealing said conduit from the atmosphere when said cut-off valve is opened, and means controlled by the fluid pressure in said conduit between said pumping means and said cut-off valve for causing said pumping means to pump liquid toward said delivery end when said cut-off valve is open and to pump liquid in the opposite direction when said cut-off valve is closed.

3. A liquid transmission system comprising a main conduit having a receiving end for connection to a supply of liquid and a delivery end, a reversible pump connected to said conduit for causing said liquid to flow in said conduit in accordance with the direction of flow through said pump, a cut-off valve in said conduit for controlling the flow of liquid from said delivery end, means including a reversing valve movable between two positions for controlling the direction of flow of liquid through said pump, check valve means connected on opposite sides of cut-off valve for temporarily maintaining a vacuum in said conduit upon opening of said cut-off valve control means actuated by vacuum for moving said valve to one position and actuated by pressure for moving said valve to the other position and conduit means connecting said control means to said main conduit at a point between said cut-off valve and said receiving end.

4. A liquid transmission system comprising a conduit having a receiving end for connection to a supply of liquid and a delivery end, means connected to said conduit for causing liquid to flow in either direction in said conduit, a cut-off valve in said conduit for controlling the flow of liquid from said delivery end, means responsive to the initial opening of said valve for establishing a predetermined vacuum in said conduit and for establishing a predetermined pressure in said conduit upon the initial closing of said valve, reversing means movable to either of two positions for controlling the direction of flow of liquid between said first means and said conduit, control means actuated by a predetermined pressure in said conduit for moving said reversing means to a position wherein said first means causes liquid to flow from said delivery end to said receiving end and actuated by a predetermined vacuum in said conduit for moving said reversing means to a position wherein said first means causes liquid to flow from said receiving end to said delivery end, and means connecting said control means and said conduit at a point intermediate said first means and said cut-off valve.

5. A liquid transmission system comprising a conduit having a receiving end for connection to a supply of liquid and a delivery end, pumping means connected to said conduit for causing liquid to flow in either direction in said conduit, a cut-off valve in said conduit for controlling the flow of liquid from said delivery end, means responsive to the initial opening of said valve for establishing a predetermined vacuum in said conduit and for establishing a predetermined pressure in said conduit upon the initial closing of said valve, means including a reversing valve movable to either of two positions for controlling the direction of flow of liquid between said pumping means and said conduit, control means actuated by a predetermined pressure in said conduit for moving said reversing valve to a position wherein said pumping means causes liquid to flow from said delivery end to said receiving end and actuated by a predetermined vacuum for moving said reversing valve to a position wherein said pumping means causes liquid to flow from said receiving end to said delivery end, and conduit means connecting said control means and said conduit at a point intermediate said pumping means and said cut-off valve.

6. A liquid transmission system comprising a main conduit having a receiving end for connection to a supply of liquid and a delivery end, pumping means connected to said conduit for causing liquid to flow in either direction in said conduit, a cut-off valve in said conduit for controlling the flow of liquid from said delivery end, means responsive to the initial opening of said valve for establishing a predetermined vacuum in said conduit and for establishing a predetermined pressure in said conduit upon the initial closing of said valve, means including a reversing valve movable to either of two positions for controlling the direction of flow of liquid between said pumping means and said main conduit, a pressure-responsive member connected to said reversing valve, conduit means for applying to said pressure-responsive member vacuum in said conduit between said pumping means and said cut-off valve to move said reversing valve to one position, and conduit means for applying to said pressure-responsive member pressure in said conduit between said pumping means and said cut-off valve to move said reversing valve to the other position, and vent means opened for admitting atmospheric pressure to said main conduit at a point between said cut-off valve and said conduit means when said cut-off valve is closed and closed when said cut-off valve is open.

7. A liquid transmission system comprising a main conduit having a receiving end for connection to a supply of liquid and a delivery end, pumping means connected to said conduit for causing liquid to flow in either direction in said conduit, a cut-off valve in said conduit for controlling the flow of liquid from said delivery end, means including a reversing valve movable to either of two positions for controlling the direction of flow of liquid between said pumping means and said main conduit, a pressure-responsive member connected to said reversing valve, conduit means for applying to said pressure-responsive member vacuum in said conduit between said pumping means and said cut-off valve to move said reversing valve, to one position, conduit means for applying to said pressure-responsive member pressure in said conduit between said pumping means and said cut-off valve to move said reversing valve to the other position, vent means opened for admitting atmospheric pressure to said meain conduit at a point between said cut-off valve and said conduit means when said cut-off valve is closed and closed when said cut-off valve is open, check valve means for preventing the flow of liquid from said main conduit through said vent means and a check valve connected in said conduit downstream of said cut-off valve.

8. A liquid transmission system comprising a main conduit having a receiving end for connection to a supply of liquid and a delivery end, pumping means connected to said conduit for causing liquid to flow in either direction in said conduit, a cut-off valve in said conduit for controlling the flow of liquid from said delivery end, means including a reversing valve movable to either of two positions for controlling the direction of flow of liquid between said pumping means and said main conduit, a pressure-responsive member connected to said reversing valve, conduit means for applying to said pressure-responsive member vacuum in said conduit between said pumping means and said cut-off valve to move said reversing valve to one position, conduit means for applying to said pressure-responsive member pressure in said conduit between said pumping means and said cut-off valve to move said reversing valve to the other position, vent means opened for admitting atmospheric pressure to said main conduit at a point between said cut-off valve and said conduit means when said cut-off valve is closed and closed when said cut-off valve is open, check valve means for preventing the flow of liquid from said main conduit through said vent means, and an outwardly opening spring-seated check valve in said conduit between said cut-off valve and said delivery end.

9. A liquid transmission system comprising a main conduit having a receiving end for connection to a supply of liquid and a delivery end, a pump having an inlet and an outlet, an eductor having a primary inlet connected to said pump outlet, a primary outlet and a secondary inlet connected to said main conduit, control valve means movable between first position connecting said pump outlet to said main conduit and a second position connecting said eductor outlet to said pump inlet, a cut-off valve in said main conduit, means responsive to the initial opening of said valve for establishing a predetermined vacuum in said conduit and for establishing a predetermined pressure in said conduit upon the intial closing of said valve, and means connected to said main conduit between said cut-off valve and said control valve means and actuated by a predetermined pressure in said main conduit for moving the latter to said second position and actuated by a predetermined vacuum in said conduit for moving said control valve to said first position.

10. A fluid transmission system comprising
a delivery nozzle,
a pump having first and second ports communicating therewith,
a conduit connected between said first port and said nozzle,
means for connecting said second port to a supply of fluid,
a cut-off valve in said nozzle for controlling the flow of fluid from said nozzle,
a venting valve mounted in said nozzle for venting said conduit to the atmosphere,
a single manually operable means for opening said cut-off valve and closing said vent valve and for closing said cut-off valve and opening said vent valve,
and control means responsive to the pressure in said conduit for causing said pump to pump fluid to said conduit when said cut-off valve is open and to pump fluid out of said conduit when said cut-off valve is closed.

11. A liquid transmission system comprising,
a conduit having a receiving end and a delivery end,
pumping means connected between said receiving end and a supply of ffuid for pumping fluid to said conduit from said supply,
a cut-off valve connected to said delivery end, for controlling the flow of fluid from said conduit,
and means resposive to an increase in pressure in said conduit when said cut-off valve is closed to cause said pump to pump fluid from said conduit to said supply.

12. The system of claim 11 comprising a vacuum breaker check valve connected in said conduit for venting said conduit to the atmosphere when the pressure in said conduit falls below atmospheric pressure.

13. A liquid transmission system comprising a conduit, reversible pump means connected in said conduit for causing a flow of fluid in one direction or the other in said conduit, a source of fluid, means connecting said source or fluid to one end of said conduit, cut-off valve means connected to the other end of said conduit, and means responsive to the actuation of said cut-off valve means for causing said pump means to force fluid in a direction toward the other end of said conduit and responsive to the non-actuation of said cut-off valve means for causing said pump to force fluid from said conduit to said fluid supply.

References Cited by the Examiner
UNITED STATES PATENTS

| | | | |
|---|---|---|---|
| 1,175,757 | 3/16 | Hathway | 137—614.2 |
| 1,763,877 | 6/30 | Bowlzer | 137—625.5 |
| 1,937,246 | 11/33 | Reedy | 137—625.5 X |
| 1,955,029 | 4/34 | Smallhouse | 137—614.2 |
| 2,708,561 | 5/55 | Ehlke | 137—625.5 X |

M. CARY NELSON, *Primary Examiner.*